United States Patent
Shamshoum et al.

[11] Patent Number: 6,143,683
[45] Date of Patent: Nov. 7, 2000

[54] METALLOCENE CATALYST AND CATALYST SYSTEM FOR POLYMERIZING AN OLEFIN HAVING AT LEAST 3 CARBON ATOMS

[75] Inventors: Edwar S. Shamshoum, Houston; Margarito Lopez, Pasadena; Ted G. Harris, III, Seabrook, all of Tex.; Sehyun Kim, Seoul, Rep. of Korea

[73] Assignee: Fina Technology, Inc., Dallas, Tex.

[21] Appl. No.: 08/835,618

[22] Filed: Apr. 9, 1997

[51] Int. Cl.[7] .............. B01J 31/00; B01J 37/00; C08F 4/02; C08F 4/60
[52] U.S. Cl. .............. 502/103; 502/113; 502/117; 526/160; 526/943
[58] Field of Search .................. 502/103, 113, 502/117

[56] References Cited

U.S. PATENT DOCUMENTS

| | | | |
|---|---|---|---|
| 4,530,914 | 7/1985 | Ewen et al. | 502/113 |
| 4,939,202 | 7/1990 | Maletsky et al. | 524/528 |
| 4,939,217 | 7/1990 | Stricklen | 502/113 |
| 4,975,403 | 12/1990 | Ewen | 502/113 |
| 5,064,797 | 11/1991 | Stricklen | 502/113 |
| 5,124,404 | 6/1992 | Atwell et al. | 525/72 |
| 5,269,807 | 12/1993 | Liu | 606/228 |
| 5,372,980 | 12/1994 | Davis | 502/103 |
| 5,444,125 | 8/1995 | Tomita et al. | 515/293 |
| 5,455,305 | 10/1995 | Galambos | 525/240 |
| 5,459,117 | 10/1995 | Ewen | 502/117 |
| 5,616,752 | 4/1997 | Patsidis et al. | 502/152 |
| 5,786,291 | 7/1998 | Speca et al. | 502/113 |
| 5,892,079 | 4/1999 | Wilson, Jr. | 502/103 |

FOREIGN PATENT DOCUMENTS

| | | |
|---|---|---|
| 581754A | 2/1994 | European Pat. Off. . |
| 0 622 410 A1 | 11/1994 | European Pat. Off. . |
| 0 650 816 A1 | 5/1995 | European Pat. Off. . |
| 747403A | 12/1996 | European Pat. Off. . |
| 7-145202 | 6/1995 | Japan . |
| WO 93/09148 | 5/1993 | WIPO . |
| 94/28034 | 12/1994 | WIPO . |
| 95/33777 | 5/1995 | WIPO . |

*Primary Examiner*—Mark L. Bell
*Assistant Examiner*—J. Pasterczyk
*Attorney, Agent, or Firm*—J. M. Gilbreth; Jimmy D. Wheelington; M. Norwood Cheairs

[57] ABSTRACT

A polyolefin metallocene catalyst which includes two metallocene components, a stereorigid isospecific metallocene catalyst component and a stereorigid syndiospecific metallocene catalyst component, both of which are supported upon the same support. A method of forming a catalyst system includes contacting the above catalyst with a cocatalyst or Lewis acid. A method of polymerization includes contacting an olefin of at least 3 carbon atoms with the catalyst system.

23 Claims, 8 Drawing Sheets

30 % miPP

50 % miPP

70 % miPP

90 % miPP

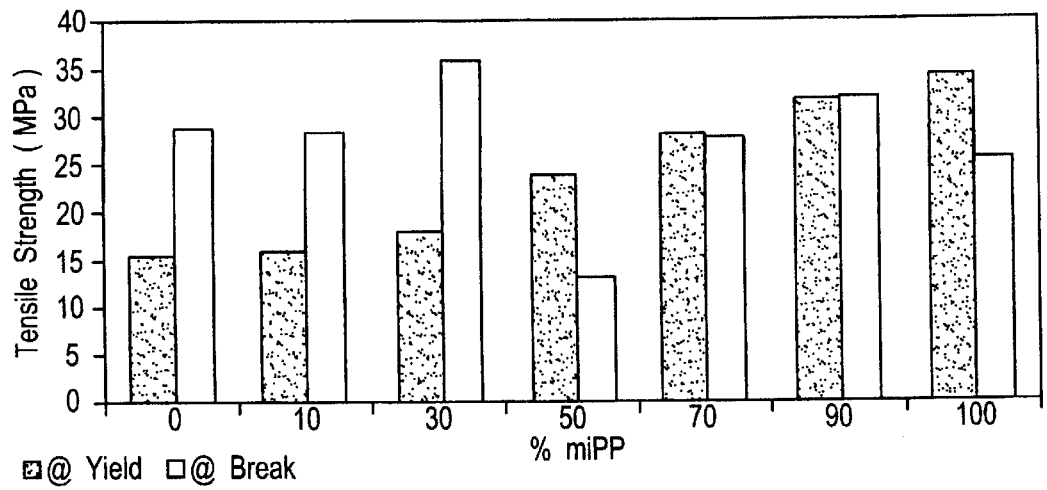
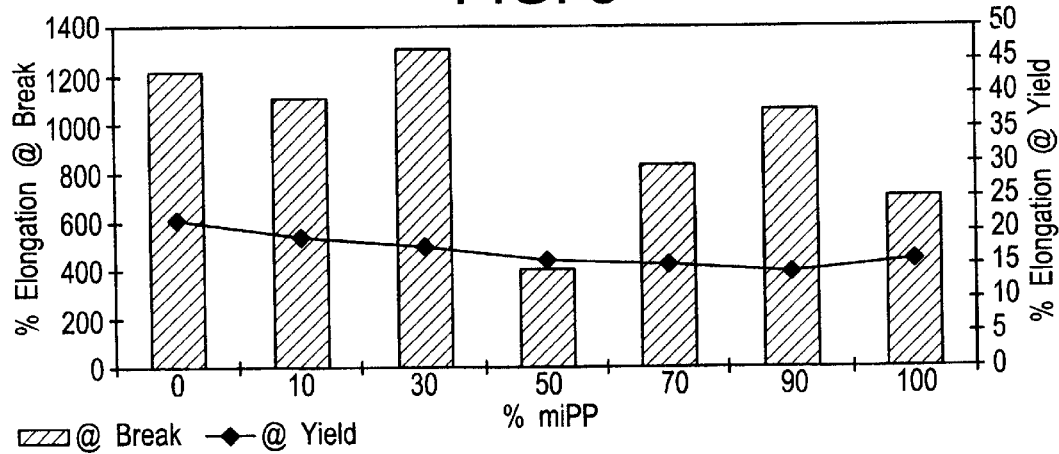
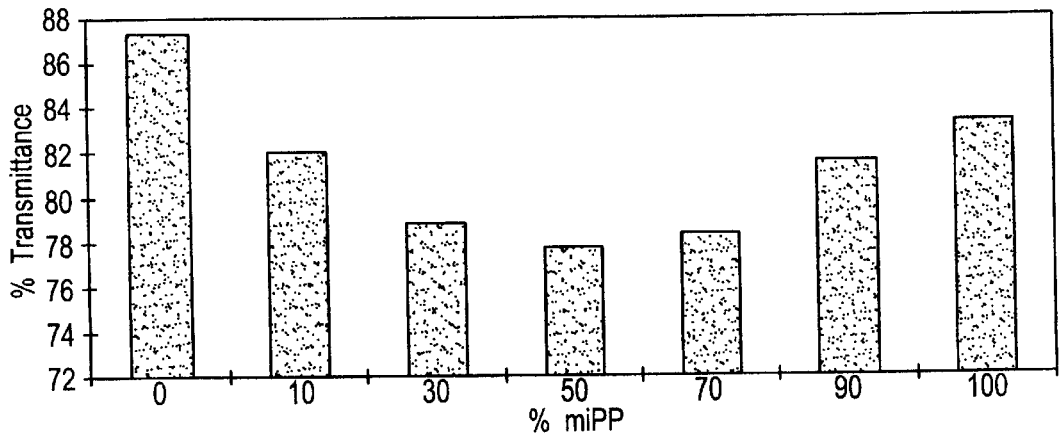

METALLOCENE CATALYST AND CATALYST SYSTEM FOR POLYMERIZING AN OLEFIN HAVING AT LEAST 3 CARBON ATOMS

BACKGROUND OF THE INVENTION

1. Field of the Invention

The present invention relates to a polymerization catalyst component, method of making such a component, to a catalyst system made therefrom, to a method of making such a catalyst system, to polymerization with such a catalyst and to polymer and products made therefrom. In another aspect the present invention relates to olefin polymerization catalyst components, to a method of making such a component, to a catalyst system made therefrom, to a method of making such a catalyst system, to polymerization with such a catalyst and to polymer and products made therefrom. In even another aspect, the present invention relates to a polymerization catalyst component for making polyethylene, to a method of making such a component, to a catalyst system made therefrom, to a method of making such a catalyst system, to polymerization with such a catalyst and to polymer and products made therefrom. In still another aspect, the present invention relates to a polymerization catalyst component useful for making propylene blends comprising iso- and syndio-tactic polypropylene, to a method of making such a component, to a catalyst system made therefrom, to a method of making such a catalyst system, to polymerization with such a catalyst, and to polymer and products made therefrom.

2. Description of the Related Art

As is well known, various processes and catalysts exist for the production of polypropylene.

For example, the traditional Ziegler-Natta catalyst systems utilize a transition metal compound cocatalyzed by an aluminum alkyl.

"Metallocene" catalysts for olefin polymerization, comprising a metallocene and an aluminum alkyl component were first proposed in the 1950s. In a metallocene catalyst system, the transition metal compound has two or more cyclopentadienyl ring ligands. Accordingly, titanocenes, zirconocenes and hafnocenes have all been utilized as the transition metal component in such "metallocene" containing catalyst systems for the production of polyolefins. When such metallocenes are cocatalyzed with an aluminum alkyl, as is the case with the traditional Ziegler-Natta catalyst system, the catalytic activity of such metallocene catalyst system is generally too low to be of any commerical interest.

It has since become known that such metallocenes may be cocatalyzed with an alumoxane, rather than an aluminum alkyl, to provide a metallocene catalyst system of high activity for the production of polyolefins.

Polypropylene has long been known to exist in several forms. In isotactic propylene (iPP), the methyl groups are attached to the tertiary carbon atoms of successive monomeric units on the same side of a hypothetical plane through the polymer chain. Syndiotactic polypropylene (sPP) has the methyl groups attached on alternating sides of the polymer chain.

U.S. Pat. No. 4,939,202, issued Jul. 3, 1990 to Maletsky et al. discloses a barrier guard moisture-proof adhesive coating comprising isotactic and syndiotactic polypropylene. The amorphous polypropylene is said to be formed in minor amounts during the production of crystalline propylene using known sterospecific catalysts.

U.S. Pat. No. 5,124,404, issued Jun. 23, 1992 to Atwell et al. discloses the grafting of brominated monomeric units onto syndiotactic or isotactic polypropylene to form flame retardant polymer.

U.S. Pat. No. 5,269,807, issued Dec. 14, 1993 to Liu discloses a suture fabricated from a blend comprising syndiotactic and isotactic polypropylene.

E.P. Patent Application No. 0 622 410 A1, published Nov. 2, 1994, discloses melt blending of syndiotactic polypropylene and isotactic polypropylene to form useful medical articles.

E.P. Patent Application No. 0 650 816 A1, published May 3, 1995, discloses injection molding blends of syndiotactic polypropylene and isotactic polypropylene. The blend is made by melt blending syndiotactic polypropylene and isotactic polypropylene.

E.P. Patent Application No. 0 615 818 A2, published May 3, 1995, discloses a method of forming a film by tubular film extrusion of a polypropylene resin composition comprising syndiotactic polypropylene and isotactic polypropylene. The blend is made by melt blending syndiotactic polypropylene and isotactic polypropylene.

U.S. Pat. No. 5,444,125, issued Aug. 22, 1995 to Tomita et al. discloses laminated olefin polymers obtained by introducing an amino group into the terminal unsaturated isotactic or syndiotactic alpha-olefin polymer having an olefinic unsaturated bond at its terminus.

U.S. Pat. No. 5,455,305, issued Oct. 3, 1995 to Galambos discloses yarn made from blends of syndiotactic polypropylene and isotactic polypropylene.

U.S. Pat. No. 5,459,117, issued Oct. 17, 1995 to Ewen discloses doubly-conformationally locked, stereorigid catalysts for the preparation of tactiospecific polymers. Specifically, a double-conformationally locked metallocene, i.e., the chain-end is locked conformationally by two sterically different substituents at the distal ring carbon atoms of the cyclopentadienyl radical. The catalysts can be designed to impart any degree of tacticity to the resulting polymers by varying the substituents at the distal ring carbon atoms.

A wide range of properties from polyolefins, when produced by Ziegler-Natta catalyst systems, is generally obtained by introducing some amounts of various comonomers. The addition of a comonomer alters the thermal characteristics, i.e., decreasing melting temperature. Ethylene is a typical comonomer for polypropylene, with various weight percentages incorporated into polypropylene depending upon the application and manufacturing process.

SUMMARY OF THE INVENTION

According to one embodiment of the present invention there is provided a polyolefin metallocene catalyst component which can generally be described as having two different sterospecific sites, syndiospecific and isospecific. This metallocene catalyst component first includes a catalyst support. The catalyst system further includes two metallocene components, a stereorigid isospecific metallocene catalyst component and a stereorigid syndiospecific metallocene catalyst component, both of which are supported upon the support.

In a more specific embodiment of the catalyst component the stereorigid isospecific metallocene catalyst component is desribed by the formula:

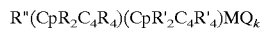

wherein $(CpR_2C_4R_4)$ and $(CpR'_2C_4R'_4)$ are substituted indenyl rings; each R and R' is a hydrogen or a hydrocarbyl radical having 1–20 carbon atoms, each R being the same or different, each R' also being the same or different, one R and R' being a hydrocarbyl radical having 1–20 carbon atoms in a proximal position adjacent to the bridgehead carbon of the indenyl rings; R" is a structural bridge between the two indenyl rings imparting stereorigidity to the indenyl rings; M is a transition metal; and each Q is a hydrocarbyl radical or is a halogen; and the stereorigid syndiospecific metallocene catalyst component is desribed by the formula:

$$R"(CpR_n)(CpR'_m)MQ_k$$

wherein each Cp is a cyclopentadienyl or substituted cyclopentadienyl ring; $R_n$ and $R'_m$ are hydrocarbyl radicals having 1–20 carbon atoms, each $R_n$ may be the same or different, and each $R'_m$ also may be the same or different; R" is a structural bridge between the two Cp rings imparting stereorigidity to the Cp rings within the catalyst component, and R" is preferably selected from the group consisting of an alkyl radical having 1–4 carbon atoms or a hydrocarbyl radical containing silicon, germanium, phosphorus, nitrogen, boron, or aluminum; M is a group 4, 5, or 6 metal from the Periodic Table of Elements; each Q is a hydrocarbyl radical having 1–20 carbon atoms or is a halogen; $0 \leq k \leq 3$; $0 \leq n \leq 4$; and $1 \leq m \leq 4$, and $R'_m$ is selected such that $(CpR'_m)$ is a substantially different substituted ring other than $(CpR_n)$.

According to another embodiment of the present invention, there is provided a method of making the above described polyolefin metallocene catalyst component. The method generally includes contacting the two above described metallocene components, that is, the stereorigid isospecific metallocene catalyst component and the stereorigid syndiospecific metallocene catalyst component, with a support.

According to even another embodiment of the present invention there is provided a catalyst system comprising the above described catalyst component and a cocatalyst or Lewis acid.

According to still another embodiment of the present invention, there is provided a method of making the above described catalyst system. The method includes contacting the polyolefin metallocene catalyst component with a cocatalyst or Lewis acid.

According to yet another embodiment of the present invention, there is provided a method for polymerizing of olefins with at least three carbon atoms. The process includes contacting olefins of at least three carbons with a catalyst system under polymerization conditions to form a blend of isotactic and syndiotactic polymer of high molecular weight and crystallinity, wherein the catalyst system is as described above.

BRIEF DESCRIPTION OF THE DRAWINGS

FIG. 7 shows tensile strength of reactor blends of the present invention.

FIG. 8 shows tensile elongation of reactor blends of the present invention.

FIG. 9 shows transmittance of reactor blends of the present invention.

DETAILED DESCRIPTION OF THE INVENTION

Figure 1:
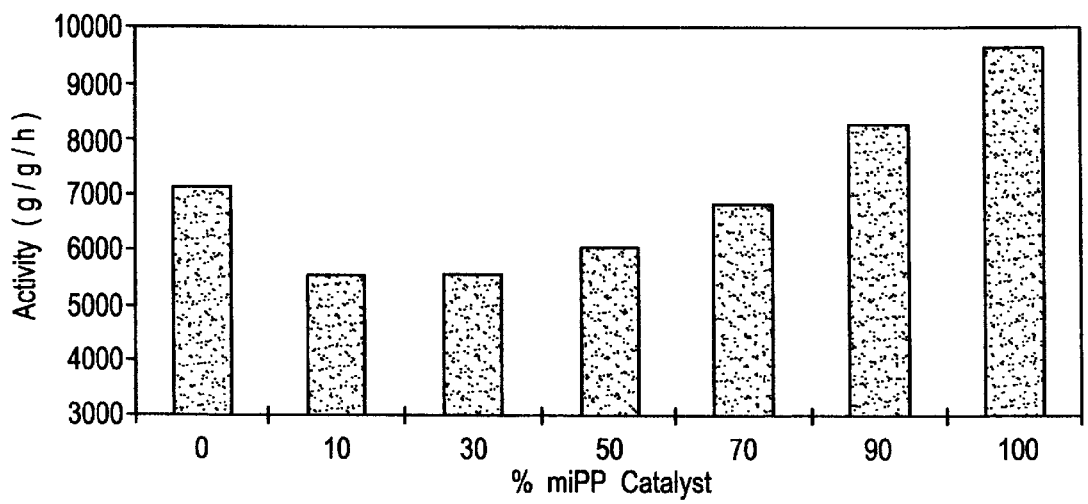
FIG. 1 shows the activity of the dual characteristic catalyst of the present invention.

The catalyst utilized in the present invention can be generally described as having both isospecific and syndiospecific metallocene components, supported upon a common supportive material.

In the present invention, isospecific metallocene catalyst components are described as those which produce predominantly isotactic polyolefin. Generally such a catalyst component will produce at least about 70 weight percent isotactic polymer, preferably at least about 90 weight percent isotactic polymer, more preferably at least about 95 weight percent isotactic polymer, and even more preferably at least about 99 weight percent isotactic polymer, all based on the total weight of polymer catalyzed by the component.

Syndiospecific metallocene catalyst components are described as those which produce predominantly syndiotactic polyolefins. Generally such a catalyst will component produce at least about 70 weight percent syndiotactic polymer, preferably at least about 90 weight percent syndiotactic polymer, more preferably at least about 95 weight percent syndiotactic polymer, and even more preferably at least about 99 weight percent syndiotactic polymer, all based on the total weight of polymer catalyzed by the syndiotactic specific component.

The isotactic structure is typically described as having the methyl groups attached to the tertiary carbon atoms of successive monomeric units on the same side of a hypothetical plane through the main chain of the polymer, e.g., the methyl groups are all above or all below the plane. Using the Fischer projection formula, the stereochemical sequence of isotactic polypropylene is described as follows:

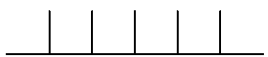

Another way of describing the structure is through the use of NMR spectroscopy. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

Syndiotactic polymers, in contrast to the isotactic structure, are those in which the methyl groups attached to the tertiary carbon atoms of successive monomeric units in the chain lie on alternate sides of the plane of the polymer. Using the Fischer projection formula, the structure of a syndiotactic polymer is designated as:

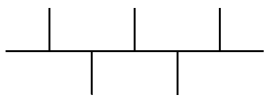

In NMR nomenclature, this pentad is described as . . . rrrr . . . in which each "r" represents a "racemic" dyad, i.e., successive methyl group on alternate sides of the plane. The percentage of r dyads in the chain determines the degree of syndiotacticity of the polymer. Syndiotactic polymers are crystalline and, like the isotactic polymers, are insoluble in xylene. This crystallinity distinguishes both syndiotactic and isotactic polymers from an atactic polymer which is soluble in xylene. Atactic polymer exhibits no regular order of repeating unit configurations in the polymer chain and forms essentially a waxy product.

While it is possible for a catalyst to produce all three types of polymer, it is desirable in the present invention to utilize a catalyst having first metallocene catalyst component which will produce predominantly isotactic polymer, and a second metallocene catalyst component which will produce predominantly syndiotactic polymer, both components which are supported on a common supportive material.

Metallocene catalyst components which produce predominantly isotactic polyolefins are disclosed in European Patent Application No. 87870132.5 (Publication No. 0 284 708 published Oct. 5, 1988), U.S. Pat. Nos. 4,794,096 and 4,975,403, and U.S. patent application Ser. No. 07/911,634, filed Jul. 10, 1992, all of which are herein incorporated by reference.

The preferred isospecific metallocene catalyst components useful in the practice of the present invention may be described by the formula $$R''(CpR_2C_4R_4)(CpR'_2C_4R'_4)MQ_k$$

wherein each $(CpR_2C_4R_4)$ and $(CpR'_2C_4R'_4)$ are substituted indenyl rings; R and R' are hydrogen or a hydrocarbyl radical having 1–20 carbon atoms, each R may be the same or different, each R' also may be the same or different, one R and R' is a proximal substituent which is a hydrocarbyl radical from 1–20 carbon atoms, preferably is an alkyl radical of 1–4 carbon atoms and, most preferably, is a methyl radical, where proximal refers to position 2 of the indenyl ring relative to the carbon attached to R" (position 1), i.e., adjacent to the bridgehead carbon, the R and R' proximal substitutents being the same or different, but preferably are the same, and the remaining R and R' substituents are preferably hydrogen; R" is a structural bridge between the two indenyl rings imparting stereorigidity to the indenyl rings within the catalyst component, preferably is a hydrocarbyl radical containing silicon as the bridging component, more preferably, is an alkyl radical of one to eight carbon atoms containing silicon as the bridging component and, most preferably is dimethylsilyl; M is a transition metal, preferably a Group 4, 5 or 6 metal from the Periodic Table of Elements, more preferably a Group 4 metal and, most preferably, is zirconium; each Q is a hydrocarbyl radical having 1–20 carbon atoms or is a halogen, preferably, is halogen and, most preferably, is chlorine; k is the valence of M minus 2. Preferably, all R and R' other than the proximal substituents are hydrogen and, most preferably, $(CpR_2C_4R_4)$ and $(CpR'_2C_4R'_4)$ are both 2-methyl indenyl.

Preferred syndiotactic metallocene components useful in the practice of the present invention include those disclosed and described in U.S. Pat. No. 4,892,851, issued Jan. 9, 1990, to Ewen et al., herein incorporated by reference.

The preferred syndiotactic metallocene components may be described by the formula $R''(CpR_n)(CpR'_m)MQ_k$ wherein each Cp is a cyclopentadienyl or substituted cyclopentadienyl ring; $R_n$ and $R'_m$ are hydrocarbyl radicals having 1–20 carbon atoms, each $R_n$ may be the same or different, and each $R'_m$ also may be the same or different; R" is a structural bridge between the two Cp rings imparting stereorigidity to the Cp rings within the catalyst, and R" is preferably selected from the group consisting of an alkyl radical having 1–4 carbon atoms or a hydrocarbyl radical containing silicon, germanium, phosphorus, nitrogen, boron, or aluminum; M is a group 4, 5, or 6 metal from the Periodic Table of Elements; each Q is a hydrocarbyl radical having 1–20 carbon atoms or is a halogen; $0 \leq k \leq 3$; $0 \leq n \leq 4$; and $1 \leq m \leq 4$. In order to be syndiospecific, it was discovered that the Cp rings in the metallocene catalyst components must be substituted in a substantially different manner so that there is a steric difference between the two Cp rings, and therefore, $R'_m$ is selected such that $(CpR'_m)$ is a substantially different substituted ring other than $(CpR_n)$. In order to produce a syndiotactic polymer, the characteristics of the groups substituted directly on the cyclopentadienyl rings seem to be important. Thus, by "steric difference" or "sterically different" as used herein, it is intended to imply a difference between the steric characteristics of the Cp rings that controls the approach of each successive monomer unit that is added to the polymer chain. The steric difference between the Cp rings acts to block the approaching monomer from a random approach and controls the approach such that the monomer is added to the polymer chain in the syndiotactic configuration.

Without intending to limit the scope of the present invention as indicated by the claims, it is believed that in the polymerization reaction both the syndiospecific metallocene catalyst components and the approaching monomers units isomerize with each monomer addition to the polymer chain. This isomerization of the monomer which is controlled by the steric blockage of the differently substituted Cp rings results in the alternating configuration characteristic of syndiotactic polymers and is in contrast to the chain-end control of the catalysts disclosed by Natta et al. The different reaction mechanism also results in a different structure for the polymer.

In a more preferred syndiospecific metallocene component useful in the present invention, M is titanium, zirconium or hafnium; Q is preferably a halogen, and it is most preferably chlorine; and k is preferably 2, but it may vary with the valence of the metal atom. Exemplary hydrocarbyl radicals include methyl, ethyl, propyl, isopropyl, butyl, isobutyl, amyl, isoamyl, hexyl, heptyl, octyl, nonyl, decyl, cetryl, phenyl, and the like. Other hydrocarbyl radicals useful in the preferred syndiospecific metallocene component include other alkyl, aryl, alkenyl, alkylaryl or arylalkyl radicals. Further, $R_n$ and $R'_m$ may comprise hydrocarbyl radicals attached to a single carbon atom in the Cp ring as well as radicals that are bonded to two carbon atoms in the ring.

In the practice of the present invention, the isospecific metallocene catalyst component and the syndiospecific metallocene catalyst component are supported on the same supportive material. The support can be any solid which is chemically inert and unreactive with both metallocene components and the other catalyst components. Non-limiting examples of support material are porous materials such as talc; inorganic oxides, such as Group 2, 13, 14 or 4 metal oxides, specifically, silica, alumina, magnesia, titania, zirconia, and mixtures thereof; and resinous materials, such as polyolefins, specifically, finely divided polyethylene, as disclosed in U.S. Pat. No. 4,701,432, hereby incorporated by reference.

The iso- and syndio- specific metallocene catalyst components may each be prepared by any method known in the art. It is important that the catalyst complex be "clean" as usually low molecular weight, amorphous polymer is produced by impure catalysts. Non-limiting examples of two useful methods of preparing the catalyst are discussed below. Generally, the preparation of the catalyst complex consists of forming and isolating the substituted indenyl ligands, the anions of which are then reacted with a halogenated metal to form the complex.

One non-limiting example of a process for preparing a bridged metallocene catalyst component comprises contacting a substituted indene having a proximal substituent on the indenyl ring with the same or another substituted indene having a proximal substituent under reaction conditions sufficient to produce a bridged substituted diindene. The process further comprises contacting the anionic form of the bridged substituted diindene with a metal compound of the formula $MQ_v$, wherein M is a Group 3, 4, 5 or 6 metal from the Periodic Table of Elements, each Q is a hydrocarbyl radical having 1–20 carbon atoms or is a halogen and v is the valence of M, under reaction conditions sufficient to complex the bridged diindene to produce a bridged metallocene. The process step of contacting the bridged substituted diindene with a metal compound can be performed in a chlorinated solvent.

Another non-limiting example of a process for preparing a bridged metallocene catalyst component comprises contacting a substituted indene having proximal substituents on the indenyl ring with an alkylsilylchloride of the formula $R^\wedge_2SiX_2$ where $R^\wedge$ is a hydrocarbyl radical having 1–20 carbon atoms and X is an halogen. A second equivalent of the same or another substituted indene having proximal substituents on the indenyl ring is added to produce a silicon bridged disubstituted indene. The subsequent steps are similar to those above for producing a bridged disubstituted indene coordinated to a metal.

The metallocene catalyst components of the present invention are useful in many of the polymerization processes known in the art including many of those disclosed for the preparation of iso- or syndio- tactic polypropylene. When the iso- and syndio- specific catalyst components of the present invention are used in these types of processes, the processes produce a blend of iso- and syndio- tactic polymers. Further examples of polymerization processes useful in the practice of the present invention include those disclosed in U.S. Pat. No. 4,767,735, U.S. Pat. No. 4,892,851, and U.S. Pat. No. 4,975,403, the disclosures of which are hereby incorporated herein by reference. These preferred polymerization procedures include the step of prepolymerizing the catalyst components by contacting the catalyst components with a cocatalyst and an olefin monomer prior to introduction into a reaction zone at a temperature below that of polymerization.

Consistent with the prior disclosures of metallocene catalyst components for the production of iso- or syndio- tactic polymers, the catalyst components of the present invention are particularly useful in combination with a cocatalyst, preferably an alumoxane, an alkyl aluminum, or other Lewis acids or a mixture thereof to form an active catalyst. In addition, a complex may be isolated between the iso- and syndio- specific metallocene catalyst components as described herein and an aluminum cocatalyst in accordance with the disclosure of U.S. Pat. Nos. 4,752,597 and 4,791,180. As disclosed therein, metallocene is reacted with an excess of alumoxane in the presence of a suitable solvent. A complex of the iso- and syndio- specific metallocene and alumoxane may be isolated and used as a catalyst in the present invention.

The alumoxanes useful in combination with the catalyst components of the present invention, either in the polymerization reaction or in forming the complex disclosed in U.S. Pat. Nos. 4,752,597 and 4,791,180, may be represented by the general formula $(R-Al-O-)_n$ in the cyclic form and $R(R-Al-O-)_n-AlR_2$ in the linear form wherein R is an alkyl group with one to five carbon atoms and n is an integer from 1 to about 20. Most preferably, R is a methyl group. The alumoxanes can be prepared by various methods known in the art. Preferably, they are prepared by contacting water with a solution of trialkyl aluminum, such as, trimethyl aluminum, in a suitable solvent such as benzene. Another preferred method includes the preparation of alumoxane in the presence of a hydrated copper sulfate as described in U.S. Pat. No. 4,404,344, the disclosure of which is hereby incorporated by reference. This method comprises treating a dilute solution of trimethyl aluminum in toluene with copper sulfate. The preparation of other aluminum cocatalysts useful in the present invention may be prepared by methods known to those skilled in the art.

An alternative to the use of MAO co-catalyst is a catalyst system of the iso- and syndio- specific metallocenes, a Lewis acid ionic ionizing agent and, optionally, an aluminum alkyl. Methods for preparing a cationic metallocene catalyst system are disclosed in European Patent Application Nos. 90870174.1, 90870175.8 and 90870176.6 (Publication Nos. 0 426 637 A2, 0 426 638 A2 and 0 427 697 A2, published on May 8, 1991; May 8, 1991 and May 15, 1991, respectively), which are hereby incorporated by reference. The ionizing agent which is an ion pair ionizes the metallocenes to a cation. The metallocene cation forms an ion pair with the anion component of the ionizing agent. The segment of the metallocene compound removed by ionization forms an anion which associates with the cation component of the ionizing agent. The ion pair formed from the anion of the segment of metallocene and the cation of ionizing agent is chemically inert and non-reactive with regard to the metallocene cation and the metallocene cation-ionizing agent anion ion pair which is an active catalyst for polymerization of olefins.

An aluminum alkyl, such as triethyl aluminum, is useful in such an ionic catalyst system to improve yields. It is believed that aluminum alkyl acts to enhance the ionizing process and to scavenge catalyst poisons.

EXAMPLES

The following Examples illustrate one embodiment of the invention for in situ production of reactor blends of syndiotactic polypropylene (sPP) and isotactic polypropylene (iPP).

Examples 1–7 show the preparation of catalysts having various compositions of syndio- and iso- stereospecificity prepared by placing both sPP and iPP metallocene catalysts on a common supportive material. Examples 8–14 show the preparation of reactor blends of syndiotactic polypropylene (sPP) and isotactic polypropylene (iPP) utilizing the catalysts of Examples 1–7. The characteristics of these produced blends were evaluated on compression molded samples.

Example 1—10:90 miPP/msPP Catalyst
Preparation of Catalyst Support 40 grams of silica was transferred into a 1.0 L, 3-neck, round bottom flask under nitrogen purge. The flask was then equipped with a reflux condenser that was capped with a gas inlet adapter, a 125 mL pressure equalized addition funnel which was capped with a rubber septum, and the last neck was capped with a rubber septum. The silica was slurried in 250 mL of toluene at room temperature. Next, 135.2 mL of a 30% MAO solution in toluene was added to the reaction mixture at room temperature. The reaction is exothermic with methane produced as a byproduct. The reaction mixture was then stirred at reflux for four hours under argon. After four hours, the reaction was left to settle while it cooled to room temperature. The supernatant was removed and the slurry was washed four times with 100 mL of toluene at room temperature. The resulting solid was dried at 70° C. for 3 hours under vacuum. The MAO/Silica support was obtained as an off-white free flowing solid.

Catalyst Preparation

To 5.0 grams of MAO/Silica in a 500 mL, 1-neck, side arm, round bottom flask, was added about 50 mL of toluene, with the resulting mixture stirred at room temperature. A 1:9 isospecific to syndiospecific metallocene ratio, which equaled 2 wt. % total loading of the combined solids was slurried in toluene and added to the MAO/Silica toluene slurry at room temperature. The mixture was slurried at room temperature for one hour under argon. The reaction mixture was left to settle at room temperature for 15 minutes and then the supernatant removed. The solids were then washed three times each with 75 mL of hexane at room temperature. The resulting solids were dried at room temperature for one hour under vacuum. The supported catalyst obtained as a purple solid.

Example 2—30:70 miPP/msPP Catalyst

The procedure of Example 1 was followed except that a 1:2.33 isospecific to syndiospecific metallocene ratio was utilized. The resulting supported catalyst obtained was a light purple solid.

Example 3—50:50 miPP/msPP Catalyst

The procedure of Example 1 was followed except that a 1:1 isospecific to syndiospecific metallocene ratio was utilized. The resulting supported catalyst obtained was a light purple-pink solid.

Example 4—70:30 miPP/msPP Catalyst

The procedure of Example 1 was followed except that a 2.33:1 isospecific to syndiospecific metallocene ratio was utilized. The resulting supported catalyst obtained was a tan solid.

Example 5—90:10 miPP/msPP Catalyst

The procedure of Example 1 was followed except that a 9:1 isospecific to syndiospecific metallocene ratio was utilized. The resulting supported catalyst obtained was a beige solid.

Example 6—0:100 miPP/msPP Catalyst

The procedure of Example 1 was followed except that a 0:1 isospecific to syndiospecific metallocene ratio was utilized. The resulting supported catalyst obtained was a purple solid.

Example 7—100:0 miPP/msPP Catalyst

The procedure of Example 1 was followed except that a 1:2.33 isospecific to syndiospecific metallocene ratio was utilized. The resulting supported catalyst obtained was a tan solid.

The catalysts produced in the above Examples 1–7 are listed in the following Table I.

TABLE I

Catalysts Employed to Produce Reactor Blends, of sPP and iPP

| catalyst | Example 6 | Example 1 | Example 2 | Example 3 | Example 4 | Example 5 | Example 7 |
|---|---|---|---|---|---|---|---|
| % miPP catalyst | 0 | 10 | 30 | 50 | 70 | 90 | 100 |
| % msPP catalyst | 100 | 90 | 70 | 50 | 30 | 10 | 0 |

Example 8—Polymerization With 10:90 miPP/msPP Catalyst

Polypropylene was prepared using the 10:90 miPP/msPP catalyst of Example 1.

Polymerization Procedure

Polymerization was conducted in a 2.0L stainless steel laboratory autoclave (Zipperclave) liquid phase batch reactor. The reactor was cleaned, dried and throughly dried with warm dry nitrogen. The autoclave reactor was then charged with 1.4 liters of liquid propylene and 16 mmoles of gaseous hydrogen. Next, 72 mg of catalyst and 108 mg of TiBAl were mixed in mineral oil and placed in a bomb. The mineral oil slurry was precontacted with a small amount of dry propylene at room temperature for about five seconds to allow for some prepolymerization prior to charging into the reactor. The mixture was then heated to 60° C., and stirred at that temperature for 60 minutes. At the end of this time, polymerization was terminated by rapidly venting the unreacted propylene out of the reactor. The resulting polymer was then separated, dried at 80° C. and submitted for analysis.

Example 9—Polymerization With 30:70 miPP/msPP Catalyst

Polypropylene was prepared according to the procedure of Example 8, except that the 30:70 miPP/msPP catalyst of Example 2 was utilized.

Example 10—Polymerization With 50:50 miPP/msPP Catalyst

Polypropylene was prepared according to the procedure of Example 8, except that the 50:50 miPP/msPP catalyst of Example 3 was utilized.

Example 11—Polymerization With 70:30 miPP/msPP Catalyst

Polypropylene was prepared according to the procedure of Example 8, except that the 70:30 miPP/msPP catalyst of Example 4 was utilized.

Example 12—Polymerization With 90:10 miPP/msPP Catalyst

Polypropylene was prepared according to the procedure of Example 8, except that the 90:10 miPP/msPP catalyst of Example 5 was utilized.

Example 13—Polymerization With 0:100 miPP/msPP Catalyst

Polypropylene was prepared according to the procedure of Example 8, except that the 0:100 miPP/msPP catalyst of Example 6 was utilized.

Example 14—Polymerization With 100:0 miPP/msPP Catalyst

Polypropylene was prepared according to the procedure of Example 8, except that the 100:0 miPP/msPP catalyst of Example 7 was utilized.

Example 15—Evaluation of Polymers

The polymers of Examples 8–14 were evaluated as follows:

Sample Preparation for NMR Spectroscopy

Polymer fluff was prepared by dissolving the prepared polypropylene in boiling xylene (80ml/1 g polymer) and then the polymer was precipitated in methanol by adding xylene solution dropwise into methanol while stirring. The precipitates were collected by filtration. Then, the filtrate was extracted with boiling heptane in a Soxhlet extractor overnight. The insoluble were dried in a vacuum oven at 60° C.

Compounding

The polymer fluff of each polypropylene reactor blend was compounded with standard antioxidants such as I-1076 (resin stabilizer antioxidants) and Irg-1076 (resin stabilizer antioxidants), using a ½' (L/D =24) laboratory microextruder (Randcastle).

DSC (Differential Scanning Calorimetry)

The thermal characteristics via dynamic crystallizations and melting were determined by DSC. Five to ten mgs of the prepared polypropylene polymer pellet was placed in a DSC aluminum pan and melted at 210° C. for 10 minutes, and then cooled to 25° C. at the rate of 10° C./min for dynamic crystallization while recording a recrystallization exotherm, followed by heating to 190° C. at the same rate to record a melting endotherm.

Compression Molding

Polypropylene polymer pellets were compression molded into 6"×8"×0.05" plaques. Forty to fifty grams polymer was placed in a 3 piece "window" mold. One ton pressure was applied to the mold at 450° F. (232° C.) for 3 minutes and then, the pressure was increased to 2.5, 5, 10 and 30 tons at one minute intervals. After holding at 30 tons for 1 minute, the mold was moved to the cold stage (5–10° C.) to quench the polymer. The molding was completed after the mold was held in the press under contact pressure for 15–20 minutes.

Tensile Properties (ASTM D638)

Type IV tensile bars were stamped out of the compression molded plaques. Five tensile bars per each blend were tested using Instron under the condition prescribed in ASTM D638.

Flexural Modulus (ASTM D790)

Rectangular flexural bars (12.7 mm×127 mm×1.2 mm) were stamped out of the compression molded plaques. Five bars (12.7 mm×50.8 mm×1.2 mm) per each plaque were prepared and tested under the condition prescribed in ASTM D790; 25.4 mm span length, 0.85 mm/min cross head speed.

Izod Impact (ASTM D256)

Rectangular bars were compression molded and then Izod bars were prepared as prescribed in ASTM D256. Izod impact resistance was determined on the notched samples.

Transparency (ASTM D1003)

The percent transmittance was measured on the compression molded plaque (0.05" thick) before cut into the desired test geometries.

Characteristics of Example 8–14 Polymers

Figure 2:
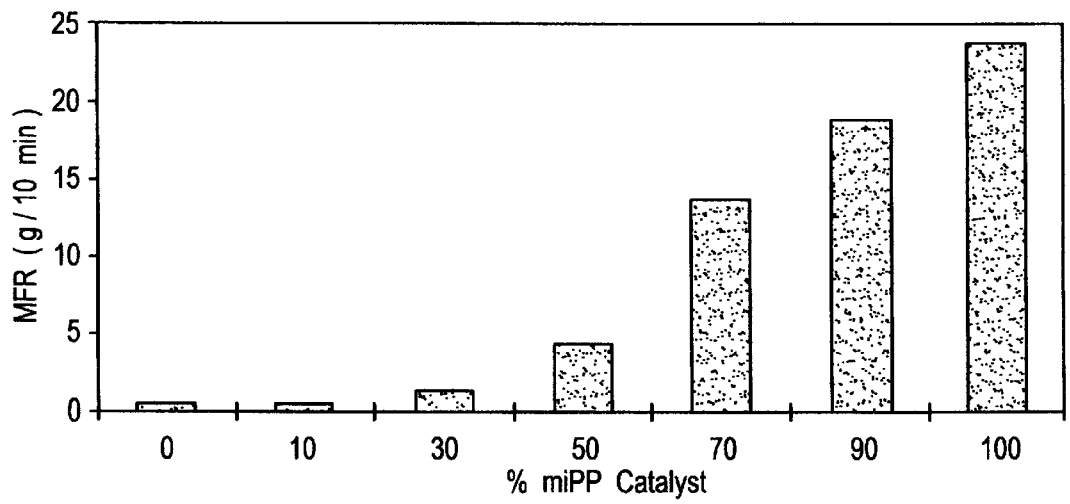
FIG. 2 shows the MFR of polymer produced with the catalyst of the present invention.
Figure 3A:
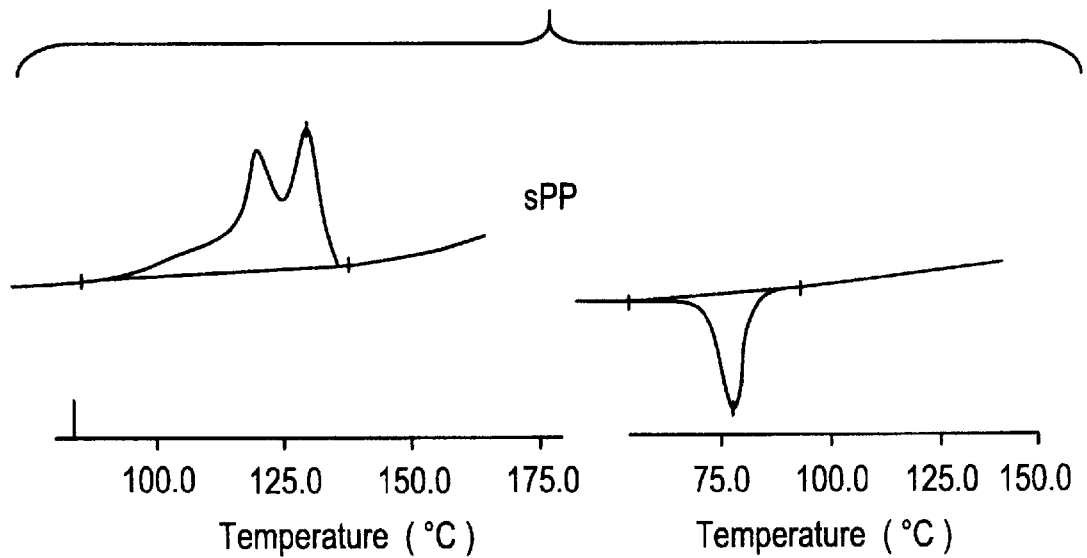
FIG. 3 shows DSC Thermograms of (a) sPP, (b)10% miPP, (c) 30% miPP, (d) 50% miPP, (e) 70% miPP, (f) 90% miPP, (g) 100% miPP.
Figure 3B:
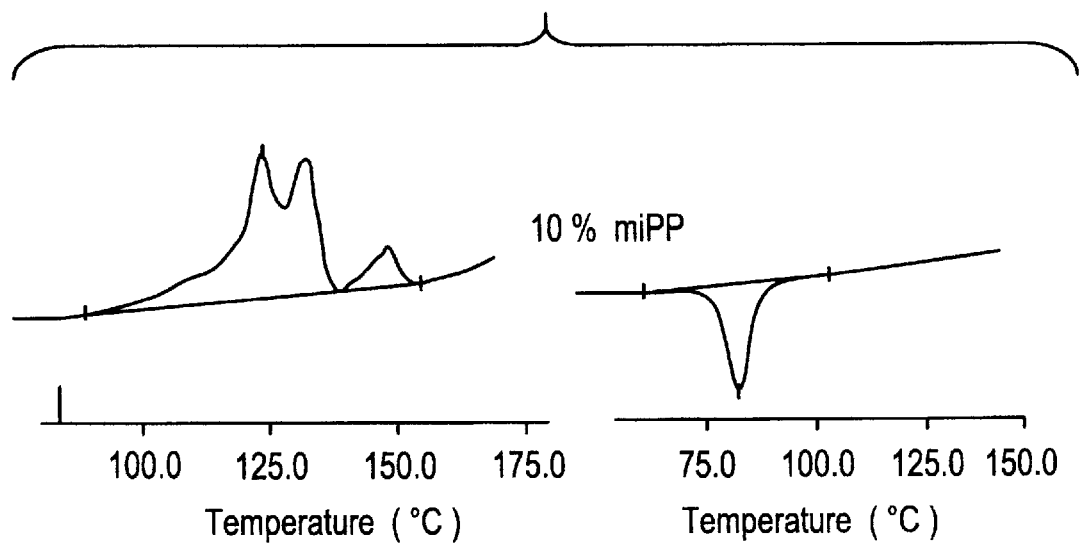
Figure 3C:
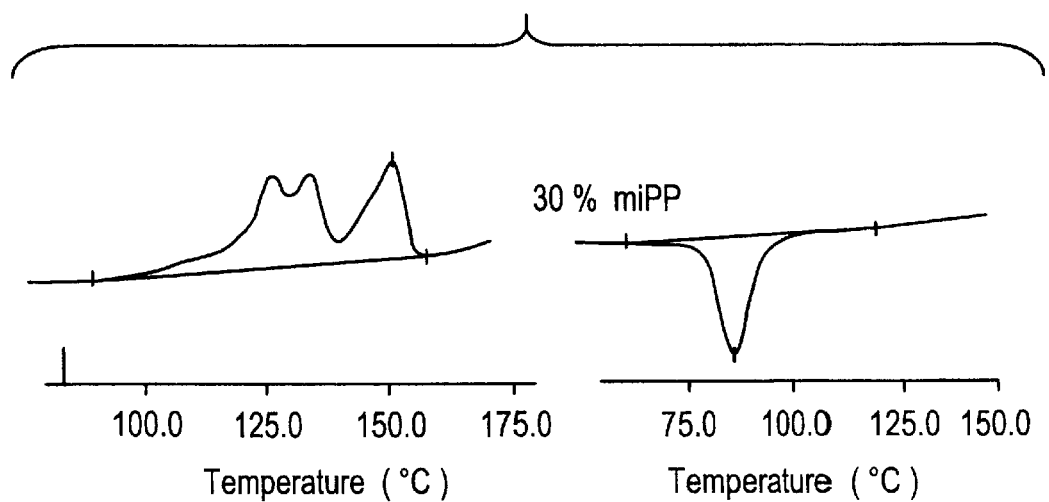
Figure 3D:
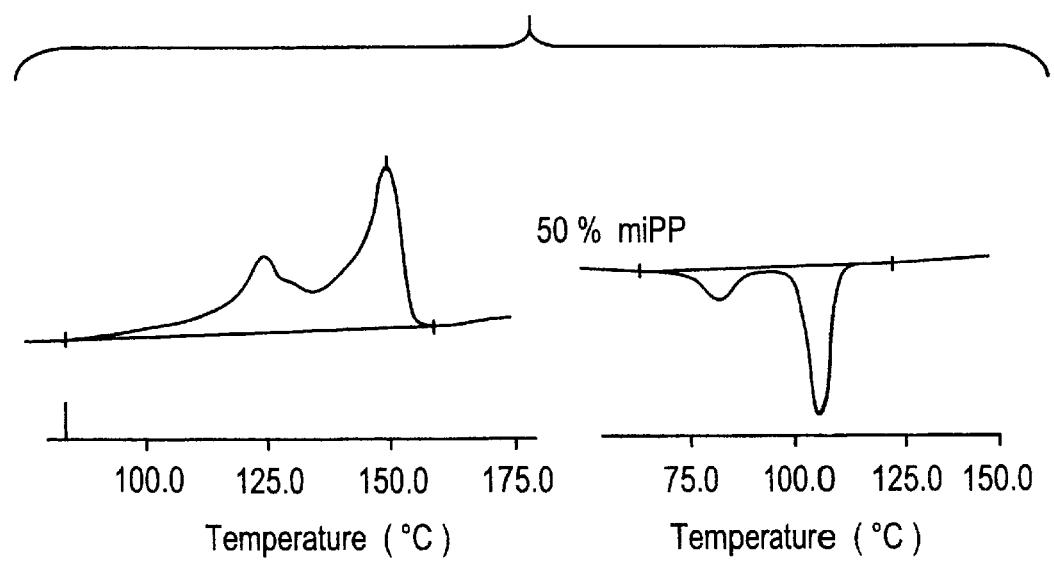
Figure 3E:
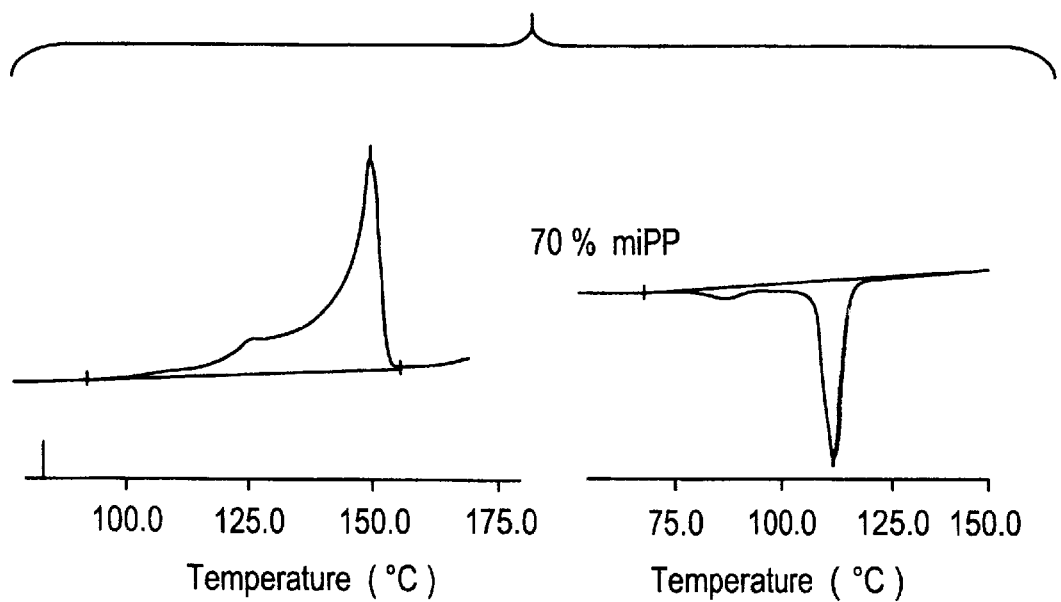
Figure 3F:
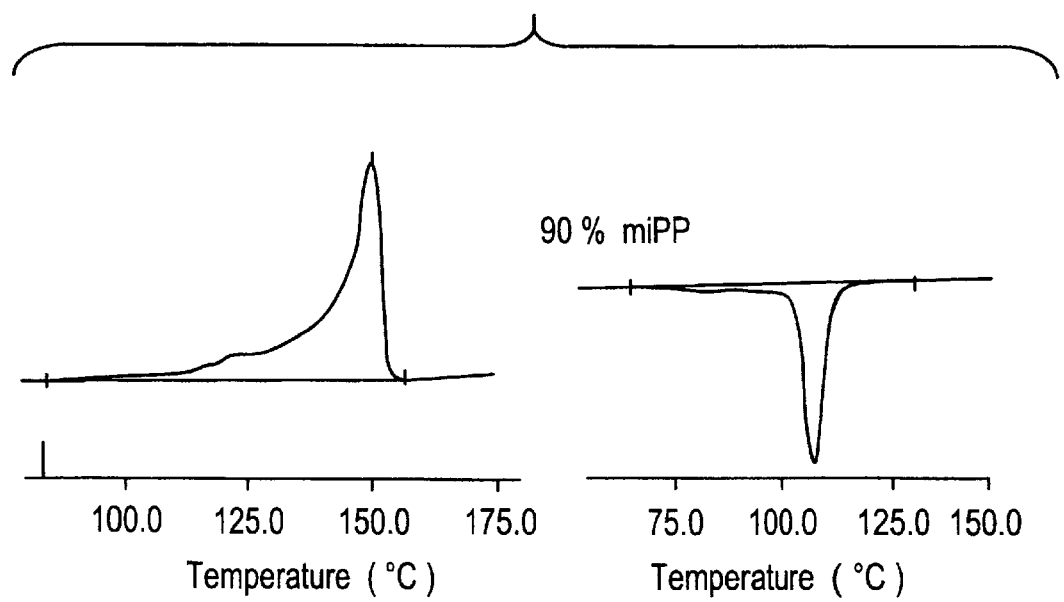
Figure 3G:
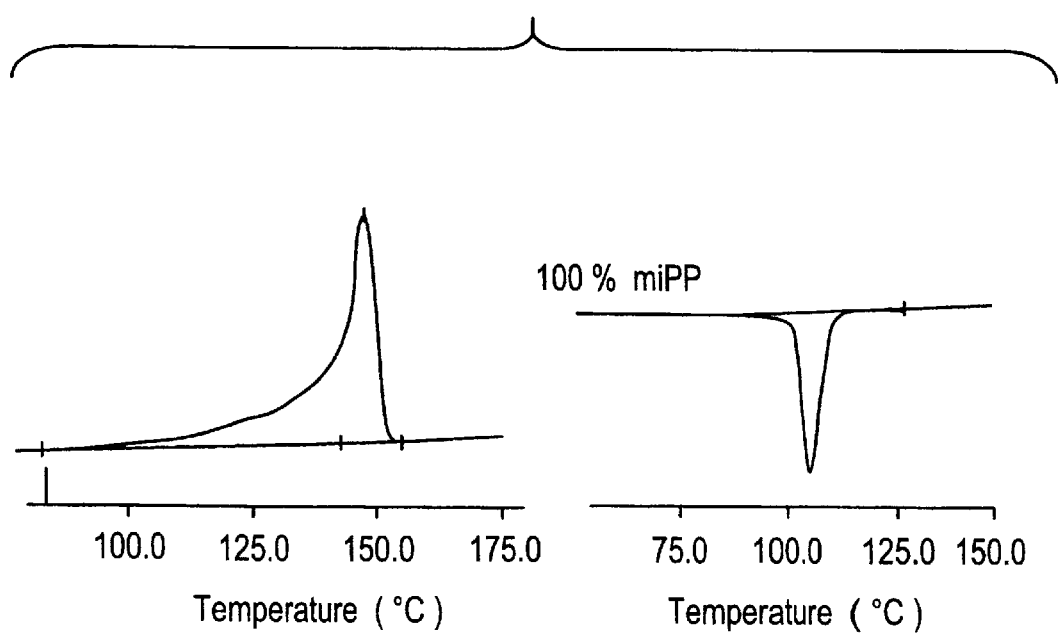

The characteristics of polymers produced in Examples 8–14 with the catalysts of Examples 1–7 having various syndio-and iso-specificity ratios are given in Table II and FIGS. 1–2. As seen in FIG. 1, under given polymerization conditions, the miPP catalyst showed approximately 30% higher activity than sPP catalyst. The dual catalyst exhibited a minimum activity when the catalyst was composed of less than 50% miPP catalyst. The amounts of xylene solubles for all the blends were less than 1%.

As shown in FIG. 2, the hydrogen responses of both sPP and iPP catalyst were significantly different; thus, the MFR of reactor blend were varied depending on the catalyst employed for blend preparation. The higher the amounts of sPP, the lower the MFR of reactor blend. These results suggest that a BMWD could be produced if the hydrogen response of the two catalysts are significantly different.

TABLE II

| | Polymer Produced with Catalyst Having Dual Characteristics | | | | | | |
|---|---|---|---|---|---|---|---|
| | Polymer | | | | | | |
| | Example 13 | Example 8 | Example 9 | Example 10 | Example 11 | Example 12 | Example 14 |
| | | | | catalyst | | | |
| | Example 6 | Example 1 | Example 2 | Example 3 | Example 4 | Example 5 | Example 7 |
| % miPP catalyst | 0 | 10 | 30 | 50 | 70 | 90 | 100 |
| yield (grams) | 510 | 396 | 397 | 429 | 493 | 587 | 689 |
| activity (g/g/h) | 7100 | 5500 | 5500 | 6000 | 6800 | 8200 | 9600 |
| bd | 0.32 | 0.30 | 0.31 | 0.30 | 0.31 | 0.33 | 0.35 |
| % XS | 0.7 | 0.7 | 0.9 | 1.1 | 0.7 | 1.0 | 1.3 |
| MFR (g/10 min) | 0.4 | — | 1.2 | 4.2 | 13.7 | 20.8 | 23.7 |
| Mn/1000 | 121 | 113 | 95 | 73 | 65 | 60 | 61 |
| Mw/1000 | 320 | 272 | 286 | 217 | 180 | 160 | 139 |

TABLE II-continued

Polymer Produced with Catalyst Having Dual Characteristics

| | Polymer | | | | | | |
|---|---|---|---|---|---|---|---|
| | Example 13 | Example 8 | Example 9 | Example 10 | Example 11 | Example 12 | Example 14 |
| | | | | catalyst | | | |
| | Example 6 | Example 1 | Example 2 | Example 3 | Example 4 | Example 5 | Example 7 |
| Mz/1000 | 670 | 541 | 649 | 512 | 3.93 | 323 | 252 |
| D | 2.6 | 2.4 | 3.0 | 3.0 | 2.8 | 2.7 | 2.3 |
| D' | 2.1 | 2.0 | 2.3 | 2.4 | 2.2 | 2.0 | 1.8 |

Microstructure of Reactor Blend

To determine the microstructure of the reactor blends, $^{13}$C-NMR spectra were recorded for selected polymers. The pentad sequence distributions of these polymers are given in Table III. It is noted that both 100% sPP and 100% miPP do not contain meso and racemic pentad sequence, respectively. When the compositions of the reactor blends were estimated from these pentad distributions, the amounts of miPP in the polymer were very close to the catalyst compositions. For example, 30% miPP catalyst produced 27% miPP, while 70% miPP catalyst 79% miPP. These results imply that the composition of polymer can be accurately estimated by the given catalyst composition.

TABLE III

Pentad Sequence Distributions of iPP, sPP and Selected Reactor Blends

| | catalyst | | | |
|---|---|---|---|---|
| | 100% sPP Example 6 | 30% miPP Example 2 | 70% miPP Example 4 | 100% miPP Example 7 |
| | | pentad | | |
| | Example 13 | Example 9 | Example 11 | Example 14 |
| mmmm | 0.00 | 22.75 | 70.08 | 90.72 |
| mmmr | 0.00 | 1.18 | 2.90 | 3.14 |
| rmmr | 2.16 | 1.57 | 0.00 | 1.11 |
| mmrr | 4.54 | 4.57 | 4.07 | 3.34 |
| xmrx | 2.63 | 2.22 | 1.25 | 0.00 |
| mrmr | 0.42 | 0.00 | 0.00 | 0.00 |
| rrrr | 81.18 | 61.76 | 18.43 | 0.00 |
| rrrm | 7.5 | 5.95 | 2.11 | 0.00 |
| mrrm | 0.96 | 0.00 | 1.06 | 1.68 |
| % meso | 6.56 | 28.89 | 75.74 | 96.65 |
| % racemic | 93.44 | 71.11 | 24.26 | 3.35 |
| error | 3.48 | 2.68 | 0.63 | 1.11 |
| def/1000 | 32.80 | 144.45 | 121.30 | 16.76 |
| % miPP[a] | 0 | 26.9 | 79.2 | 100 |

[a]calculated from % mmmm and % rrrr.

Thermal Characteristics

The thermal characteristics of sPP blends are given in Table IV, while DSC thermograms are shown in FIG. 3. As has been known, sPP shows dual melting endotherms and crystallizes at a significantly lower temperature than miPP (70 vs 107° C.). Such a high crystallization temperature of miPP could prove to be advantageous over a propylene copolymer ($T_c$=80–95° C.) in sPP blends.

TABLE IV

Thermal Characteristics of Reactor Blends

| Blend of Example | 13 | 8 | 9 | 10 | 11 | 12 | 14 | 14 |
|---|---|---|---|---|---|---|---|---|
| % miPP | 0 | 10 | 30 (26.9)[a] | 50 | 70 (79.2)[a] | 90 | 100 | 100 |
| $T_m$ (° C.) | 119.5 | 120.0 | 120.3 | 123.1 | 121.1 | — | — | — |
| | 130.1 | 129.9 | 130.0 | — | — | — | — | 138.3 |
| | — | 147.5 | 148.8 | 148.8 | 148.8 | 148.6 | 149.0 | 151.8 |
| $\Delta H_m$ (J/g) | 31.4 | 29.4 | 37.1 | 56.4 | 72.8 | 79.8 | 86.9 | 88.5 |
| $T_c$ (° C.) | 70.5 | 71.5 | 72.3 | 83.8 | 82.4 | 82 | — | — |
| | | | | 106.9 | 110.2[b] | 106.8 | 107.2 | 119.7 |
| $\Delta H_c$ (J/g) | 32.3 | 35.4 | 46.0 | 58.1 | 80.2 | 88.8 | 84.9 | 88.2 |

[a]determined by $^{13}$C-NMR
[b]appears to be contaminated.
[c]contains 2500 Nalluy.

Figure 4A:
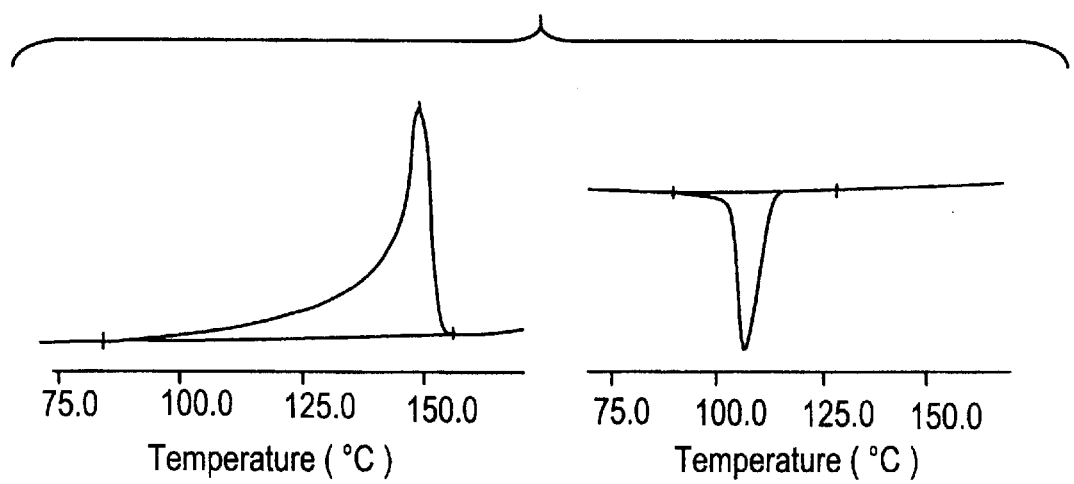
FIG. 4 shows DSC Thermograms of miPP (a) without and (b) with Nucleator.
Figure 4B:
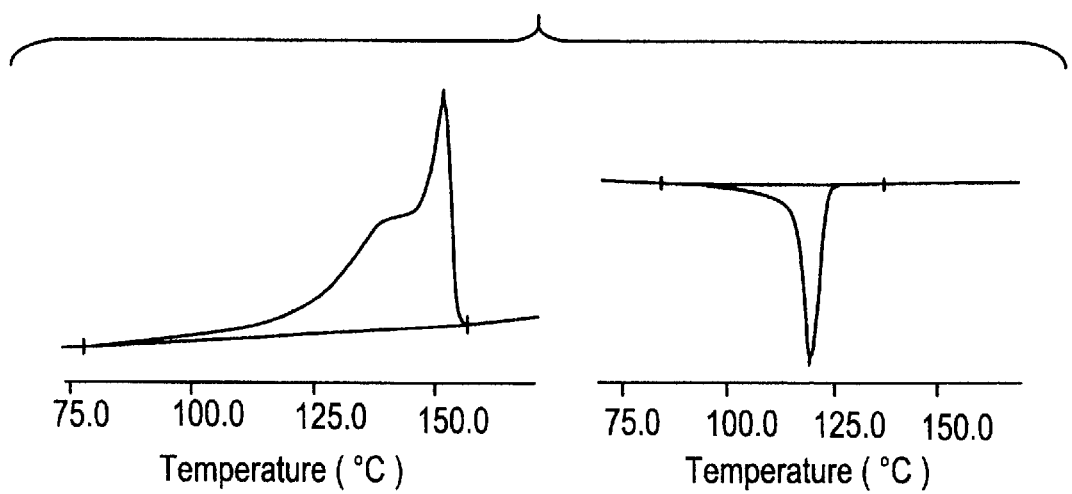

The presence of miPP in the blend is evident as seen in DSC melting endotherms (147–149° C.) and in recrystallization exotherms (107° C.). The third melting peak, exclusively from miPP, appears even at 10% loading of miPP, while the additional recrystallization peak at >30% miPP. These results indicate that sPP and miPP are not compatible most likely due to the structural feature of each polymer. In addition, an interesting melting endotherm was observed in the presence of nucleator (2500 ppm Na11uy), as shown in FIG. 4.

Figure 5:
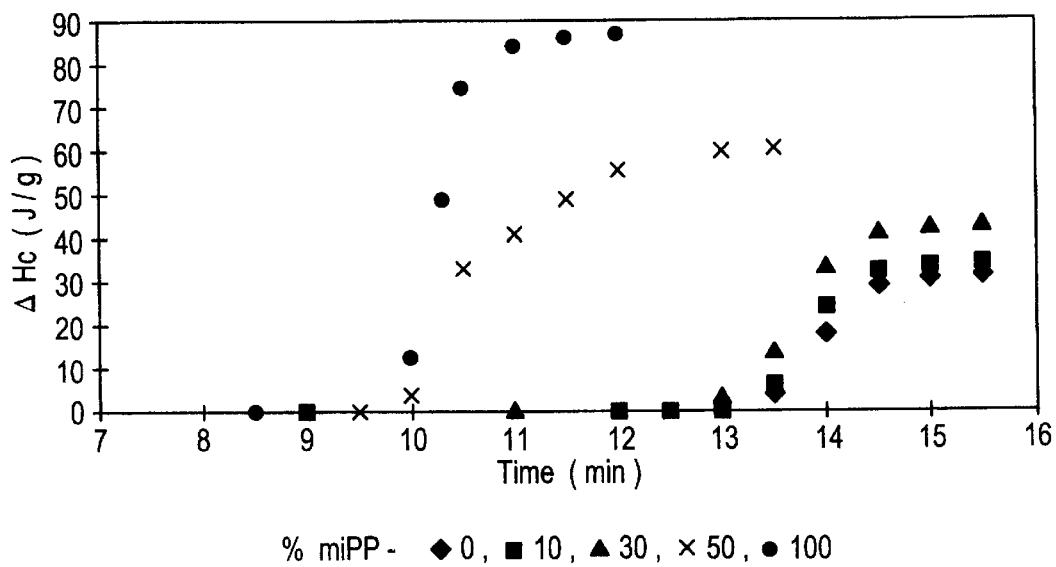
FIG. 5 shows dynamic crystallization of sPP, miPP and their reactor blends cooled from the melt (210° C.) @ the rate of 10° C./min.

The rates of dynamic crystallization for sPP, miPP and their reactor blends were determined by plotting exothermic heat generated during recrystallization with time elapsed from the melt (210° C.), where the raw data are given in Table V. As seen in FIG. 5, the crystallization rate, in terms of the slope of the curve, significantly increases with increasing amount of miPP. Furthermore, the induction period for crystallization decreases with increasing amount of miPP. These results suggest that the crystallizability of sPP could be significantly improved by the addition of some amounts of miPP (>30%).

TABLE V

Raw Data For Dynamic Crystallization

| Blend of example | 13 | 8 | 9 | 10 | 14 |
|---|---|---|---|---|---|
| miPP (wt %) | 0 | 10 | 30 | 50 | 100 |
| t (min) | | | $\Delta H_c$ (J/g) | | |
| 8.5 | | | | | 0 |
| 9.0 | | | | 0 | 0.037 |

TABLE V-continued

Raw Data For Dynamic Crystallization

| Blend of example miPP (wt %) t (min) | 13 0 | 8 10 | 9 30 | 10 50 | 14 100 |
|---|---|---|---|---|---|
| | | | $\Delta H_c$ (J/g) | | |
| 9.5 | | | | 0.055 | |
| 10.0 | | | | 3.442 | 12.270 |
| 10.3 | | | | | 48.565 |
| 10.5 | | | | 32.936 | 74.181 |
| 11.0 | | | 0 | 40.927 | 83.863 |
| 11.5 | | | | 48.713 | 85.882 |
| 12.0 | 0 | 0 | 0.228 | 55.343 | 86.833 |
| 12.5 | 0.125 | 0.178 | | | |
| 13.0 | 0.638 | 1.065 | 3.514 | 59.506 | |
| 13.5 | 3.529 | 6.00 | 13.68 | 60.163 | |
| 14.0 | 17.778 | 24.156 | 33.385 | | |
| 14.5 | 28.882 | 32.165 | 40.877 | | |
| 15.0 | 30.533 | 33.453 | 42.065 | | |
| 15.5 | 31.151 | 34.038 | 42.597 | | |

Physical Properties

Figure 6:
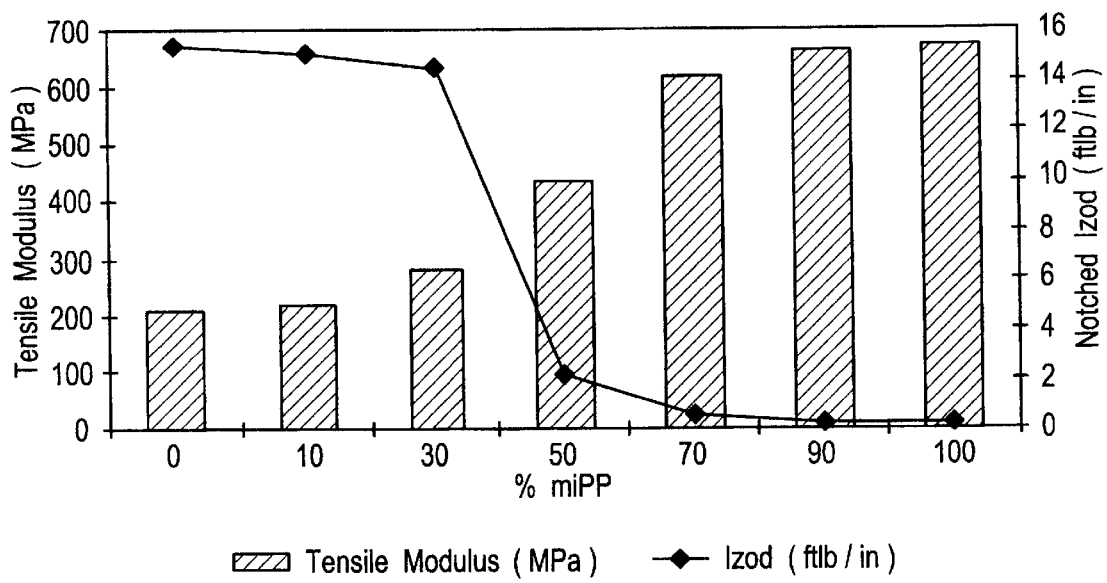
FIG. 6 shows tensile modulus and Izod impact of reactor blends of the present invention.

The physical properties of the melt blends, determined on the compression molded samples, are given in Table VI. Tensile modulus and Izod impact of the reactor blends are shown in FIG. 6, while other tensile properties are presented in FIGS. 7 and 8. The moduli of sPP blends were enhanced by increasing amounts of miPP, which can be attributed to increases in crystallinity. On the other hand, the impact property increased with increasing amounts of sPP. The blend of 50/50 sPP and miPP has Izod impact similar to normal high impact polystyrene (100 J/m).

As shown in FIG. 7, the tensile strength at yield increased with increasing amounts of miPP due to increased overall crystallinity. The blends having less than 50% of miPP or sPP show strain hardening upon drawing. On the other hand, significantly low values of tensile strength and elongation at break for the blends containing 50% miPP were obtained (FIGS. 7 and 8). These results indicate that incompatibility of sPP and miPP may be maximized at 50%. The same trend were observed in transparency of the blend (FIG. 9).

TABLE VI

Physical Properties of SPP, miPP and Their Reactor Blends

| Blend of Example | 13 | 6 | 9 | 10 | 11 | 12 | 14 | 14 |
|---|---|---|---|---|---|---|---|---|
| % miPP | 0 | 10 | 30 (26.9)[b] | 50 | 70 (79.2)[b] | 90 | 100 | 100 |
| Tensile M. (MPa) | 207 | 214 | 276 | 428 | 614 | 662 | 669 | 786 |
| Tensile Strength | | | | | | | | |
| @ yield (MPa) | 15.3 | 15.6 | 17.7 | 23.5 | 27.8 | 31.4 | 33.9 | 36.3 |
| @ break (MPa) | 28.5 | 28.2 | 35.8 | 12.8 | 27.4 | 31.7 | 25.2 | 26.2 |
| % elongation | | | | | | | | |
| @ yield | 21.6 | 19.3 | 17.7 | 15.8 | 15.0 | 14.2 | 15.8 | 13.2 |
| @ break | 1200 | 1100 | 1300 | 393 | 827 | 1050 | 695 | 553 |
| Izod (ftlb/in) | 15.4[c] | 15.1[c] | 14.5[c] | 2.1 | 0.5 | 0.3 | 0.3 | 0.3 |
| % transmittance | 87.2 | 81.9 | 78.8 | 77.7 | 78.3 | 81.5 | 83.2 | — |

[a]contains 2500 ppm Na1 1uy
[b]determined by $^{13}$C-NMR
[c]The samples were not broken.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A catalyst system for polymerization of olefins of at least three carbon atoms comprising:
    (a) a catalyst support;
    (b) a stereorigid isospecific metallocene catalyst component supported upon the support;
    (c) a stereorigid syndiospecific metallocene catalyst component supported upon the support; and,
    (d) a cocatalyst or a Lewis acid ionic ionizing agent;
    wherein the catalyst system affords a mixture of both isospecific and syndiospecific polymers when reacted with alpha olefins having at least 3 carbon atoms in them, and the molar ratio of (b) to (c) is less than 1:1.

2. The catalyst system of claim 1 wherein,
the stereorigid isospecific metallocene catalyst component is described by the formula:

$$R''(CpR_2C_4R_4)(CpR'_2C_4R'_4)MQ_k$$

wherein $(CpR_2C_4R_4)$ and $(CpR'_2C_4R'_4)$ are substituted indenyl rings; each R and R' is a hydrogen or a hydrocarbyl radical having 1–20 carbon atoms, each R being the same or different, each R' also being the same or different, one R and R' being a hydrocarbyl radical having 1–20 carbon atoms in a proximal position adjacent to the bridgehead carbon of the indenyl rings; R" is a structural bridge between the two indenyl rings imparting stereorigidity to the indenyl rings; M is a transition metal; each Q is a hydrocarbyl radical or is a halogen; and k is the valence of M minus 2; and wherein the stereorigid syndiospecific metallocene catalyst component is described by the formula:

$$R''(CpR_n)(CpR'_m)MQ_k$$

wherein each Cp is a cyclopentadienyl or substituted cyclopentadienyl ring; $R_n$ and $R'_m$ are hydrocarbyl radicals having 1–20 carbon atoms, each $R_n$ may be the same or different, and each $R'_m$ also may be the same or different; R" is a structural bridge between the two Cp rings imparting stereorigidity to the Cp rings within the catalyst, and R" is selected from the group consisting of an alkylene radical having 1–4 carbon atoms or a hydrocarbyl radical containing silicon, germanium, phosphorus, nitrogen, boron, or aluminum; M is a group 4, 5, or 6 metal from the Periodic Table of Elements; each Q is a hydrocarbyl radical having 1–20 carbon atoms or is a halogen; $0 \leq k \leq 3$; $0 \leq n \leq 4$; and $1 \leq m \leq 4$, and $R'_m$ is selected such that $(CpR'_m)$ is a substantially different substituted ring compared to $(CpR_n)$.

3. The catalyst system of claim 2 wherein the isospecific metallocene component comprises:

4. The catalyst system of claim 2
wherein for the isospecific metallocene component R and R' are the same; and,
wherein for the syndiospecific metallocene component $R'_m$ is selected such that $(CpR'_m)$ forms a fluorenyl or indenyl radical.

5. The catalyst system of claim 2
wherein for the isospecific metallocene component R and R' is an alkyl radical of 1–4 carbon atoms; and
wherein for the syndiospecific metallocene component R" is selected from the group consisting of an alkylene radical having 1–4 carbon atoms, a silicon hydrocarbyl radical, a germanium hydrocarby radical, a phosphorus hydrocarbyl radical, a nitrogen hydrocarby radical, a boron hydrocarbyl radical, and an aluminum hydrocarbyl radical.

6. The catalyst system of claim 2
wherein for the isospecific metallocene component R and R' are each a methyl radical; and
wherein for the syndiospecific metallocene component R" is an isopropylene, cyclopropylene, dimethylsilylene, methylene or ethylene radical.

7. The catalyst system of claim 2
wherein for the isospecific metallocene component R" is a hydrocarbyl radical containing silicon as the bridging component; and
wherein for the syndiospecific metallocene component n is 0.

8. The catalyst system of claim 2
wherein the isospecific metallocene component comprises a rac- dimethylsilylenebis (2-methylindenyl) radical; and
wherein the syndiospecific metallocene component comprises an isopropylenyl (cyclopentadienyl-1-fluorenyl) radical.

9. The catalyst system of claim 2 wherein for both the isospecific metallocene component and the syndiospecific metallocene component, M is a Group 4, 5 or 6 metal.

10. The catalyst system of claim 2 wherein for both the isospecific metallocene component and the syndiospecific metallocene component, M is zirconium.

11. The catalyst system of claim 2 wherein for both the isospecific metallocene component and the syndiospecific metallocene component, Q is a halogen.

12. The catalyst system of claim 2 wherein for both the isospecific metallocene component and the syndiospecific metallocene component, the cocatalyst is an alumoxane.

13. A method of making a catalyst system for polymerization of olefins of at least three carbon atoms, the method comprising:

contacting a supported catalyst comprising (i) a catalyst support, (ii) a stereorigid isospecific metallocene catalyst component supported upon the support, and (iii) a stereorigid syndiospecific metallocene catalyst component supported upon the support, with a cocatalyst or a Lewis acid ionic ionizing agent;

wherein the catalyst system affords a mixture of both isospecific and syndiospecific polymers when reacted with alpha olefins having at least 3 carbon atoms in them, and the molar ratio of (ii) to (iii) is less than 1:1.

14. The method of claim 13 wherein,
the stereorigid isospecific metallocene catalyst component is described by the formula:

wherein $(CpR_2C_4R_4)$ and $(CpR'_2C_4R'_4)$ are substituted indenyl rings; each R and R' is a hydrogen or a hydrocarbyl radical having 1–20 carbon atoms, each R being the same or different, each R' also being the same or different, one R and R' being a hydrocarbyl radical having 1–20 carbon atoms in a proximal position adjacent to the bridgehead carbon of the indenyl rings; R" is a structural bridge between the two indenyl rings imparting stereorigidity to the indenyl rings; M is a transition metal; each Q is a hydrocarbyl radical or is a halogen; and k is the valence of M minus 2; and wherein the stereorigid syndiospecific metallocene catalyst component is described by the formula:

wherein each Cp is a cyclopentadienyl or substituted cyclopentadienyl ring; $R_n$ and $R'_m$ are hydrocarbyl radicals having 1–20 carbon atoms, each $R_n$ may be the same or different, and each $R'_m$ also may be the same or different; R" is a structural bridge between the two Cp rings imparting stereorigidity to the Cp rings within the catalyst, and R" is selected from the group consisting of an alkylene radical having 1–4 carbon atoms or a hydrocarbyl radical containing silicon, germanium, phosphorus, nitrogen, boron, or aluminum; M is a group 4, 5, or 6 metal from the Periodic Table of Elements; each Q is a hydrocarbyl radical having 1–20 carbon atoms or is a halogen; $0 \leq k \leq 3$; $0 \leq n \leq 4$; and $1 \leq m \leq 4$, and $R'_m$ is selected such that $(CpR'_m)$ is a substantially different substituted ring compared to $(CpR_n)$.

15. The catalyst system of claim 14 wherein the isospecific metallocene component comprises:

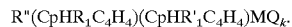

16. The method of claim 14
wherein for the isospecific metallocene component R and R' are the same; and,
wherein for the syndiospecific metallocene component $R'_m$ is selected such that $(CpR'_m)$ forms a fluorenyl or indenyl radical.

17. The method of claim 16
wherein for the isospecific metallocene component R and R' is an alkyl radical of 1–4 carbon atoms; and wherein for the syndiospecific metallocene component R" is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical.

18. The catalyst system of claim 14 wherein for the isospecific metallocene component R and R' are each a methyl radical; and wherein for the syndiospecific metallocene component R" is an isopropylene, cyclopropylene, dimethylsilylene, methylene or ethylene radical.

19. The method of claim 14 wherein for the isospecific metallocene component R" is a hydrocarbyl radical containing silicon as the bridging component; and wherein for the syndiospecific metallocene component n is 0.

20. The catalyst system of claim 14 wherein the isospecific metallocene component comprises a rac-dimethylsilylenebis (2-methylindenyl) radical; and wherein the syndiospecific metallocene component comprises an isopropylenyl (cyclopentadienyl-1-fluorenyl) radical.

21. The catalyst system of claim 14 wherein for both the isospecific metallocene component and the syndiospecific metallocene component, M is a Group 4, 5 or 6 metal.

22. The catalyst system of claim 14 wherein for both the isospecific metallocene component and the syndiospecific metallocene component, M is zirconium.

23. The method of claim 14 wherein for both the isospecific metallocene component and the syndiospecific metallocene component, Q is a halogen.

* * * * *